United States Patent [19]
Rogers

[11] Patent Number: 5,684,634
[45] Date of Patent: Nov. 4, 1997

[54] HEAD-UP DISPLAYS

[75] Inventor: Philip Rogers, Clwyd, Wales

[73] Assignee: Pilkington P.E. Limited, Merseyside, England

[21] Appl. No.: 513,781

[22] PCT Filed: Mar. 9, 1994

[86] PCT No.: PCT/GB94/00450

§ 371 Date: Oct. 17, 1995

§ 102(e) Date: Oct. 17, 1995

[87] PCT Pub. No.: WO94/20874

PCT Pub. Date: Sep. 15, 1994

[30] Foreign Application Priority Data

Mar. 11, 1993 [GB] United Kingdom ............... 9304944

[51] Int. Cl.⁶ .................................................. G02B 27/14
[52] U.S. Cl. ........................... 359/630; 359/631; 359/637
[58] Field of Search .................................... 359/630, 631, 359/633, 638, 640, 637; 345/7, 8; 348/115

[56] References Cited

U.S. PATENT DOCUMENTS

| | | | |
|---|---|---|---|
| 3,940,204 | 2/1976 | Withrington | 359/19 |
| 4,218,111 | 8/1980 | Withrington | 359/13 |
| 4,407,564 | 10/1983 | Ellis | 345/7 |
| 4,799,765 | 1/1989 | Ferrer | 359/13 |
| 4,859,030 | 8/1989 | Rotier | 359/631 |
| 4,927,234 | 5/1990 | Banbury et al. | 359/630 |
| 4,961,626 | 10/1990 | Fournire, Jr. et al. | 359/630 |
| 4,969,714 | 11/1990 | Fournier, Jr. et al. | 353/174 |
| 4,997,263 | 3/1991 | Cohen | 359/49 |
| 5,384,654 | 1/1995 | Iba | 359/364 |
| 5,459,612 | 10/1995 | Ingleton | 359/630 |
| 5,499,139 | 3/1996 | Chen et al. | 359/649 |
| 5,513,041 | 4/1996 | Togino | 359/631 |
| 5,537,253 | 7/1996 | Cox | 359/630 |

FOREIGN PATENT DOCUMENTS

| | | |
|---|---|---|
| 0007039 | 1/1980 | European Pat. Off. . |
| 0 009 332 | 4/1980 | European Pat. Off. . |
| 0 303 742 | 2/1989 | European Pat. Off. . |
| 0 479 059 | 4/1992 | European Pat. Off. . |
| 0 526 067 | 2/1993 | European Pat. Off. . |
| 2 000 778 | 9/1969 | France . |
| 2 593 932 | 8/1987 | France . |
| 2 186 384 | 8/1987 | United Kingdom . |
| 87/01211 | 2/1987 | WIPO . |

OTHER PUBLICATIONS

Abstract of Japan—vol. 11, No. 303 (P–622) and JP,A,62 094 816 (Mitsubishi), May 1, 1987.

"Optical Systems For Use In Combined Map And Cathode–Ray–Tube Displays", David G. Norrie, vol. 237, 1980, pp. 524–529.

"Holographic Huds De–Mystified", Jerold H. Gard, May 18, 1982, vol. 2, pp. 752–759.

*Primary Examiner*—Georgia Y. Epps
*Assistant Examiner*—Ricky Mack
*Attorney, Agent, or Firm*—Bell, Seltzer, Park & Gibson, P.A.

[57] ABSTRACT

A head-up display 10 comprises a display device 11 for generating information to be presented to an operator 15 in superimposition with his forward view of the outside world 16, via an off-axis reflectively-powered combiner optic 14 for effecting said superimposition and a relay optic 12, 18 between the display device 11 and the combiner optic 14. The relay optic 12, 18 forms an intermediate image 13 of the displayed information in advance of the combiner optic 14 and the combiner optic 14 collimates the intermediate image for delivery to the operator 15 and re-images the aperture stop formed by the relay optic 12, 18 as an exit pupil at the operator's eye position 20. The relay optic 12, 18 comprises a relay lens 12 and an axis deviation arrangement 18, having a pair of surfaces A, B preferably formed of holograms which are mutually inclined at an acute angle each surface A, B being both transmissive and reflective according to the angle of incidence of light thereon.

11 Claims, 1 Drawing Sheet

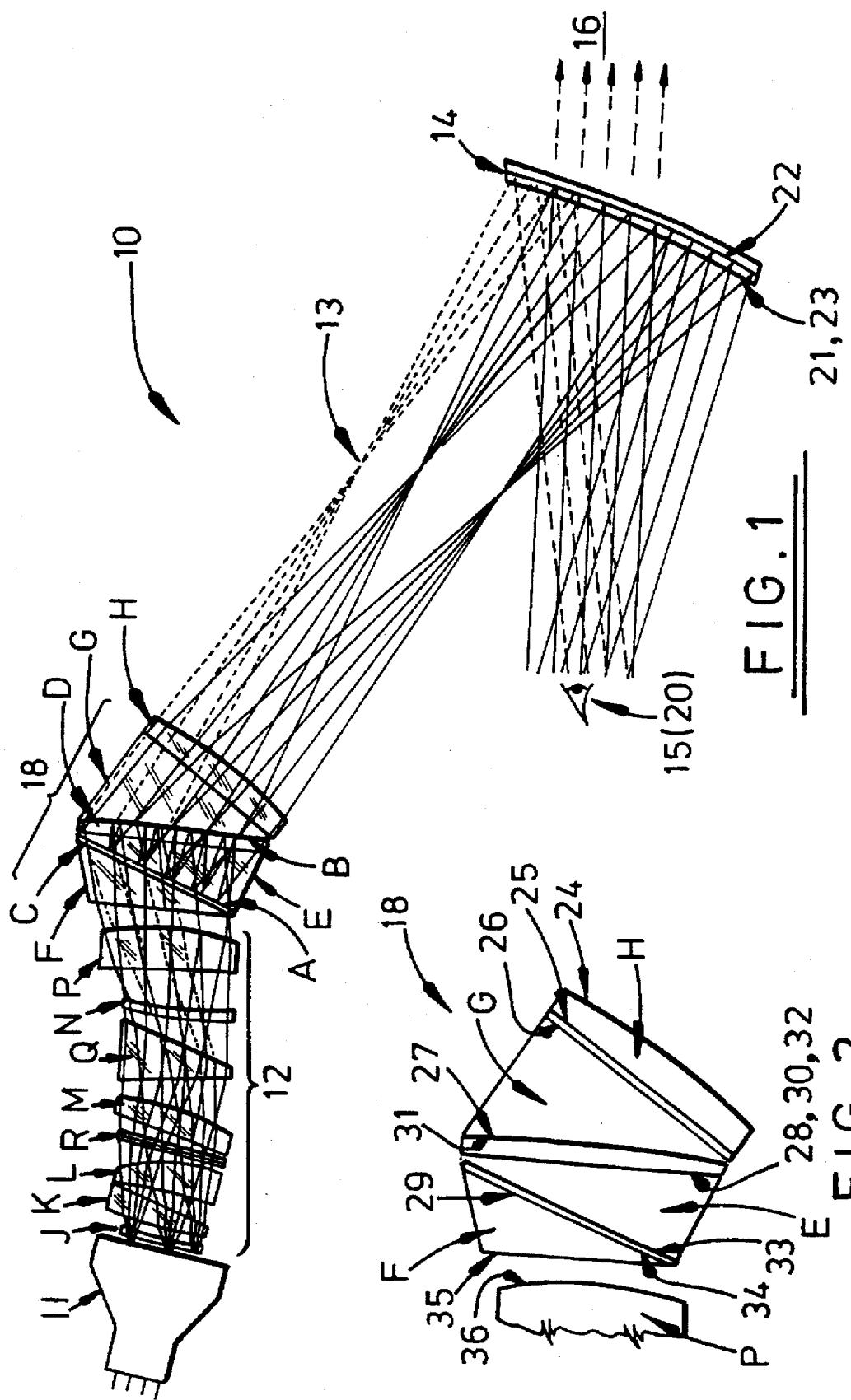

HEAD-UP DISPLAYS

BACKGROUND OF THE INVENTION

This invention relates to head-up displays.

Head-up displays (HUDs) have been in use for many years, particularly in military aircraft, and present information to the pilot such that it appears focussed a long distance in front of him and superimposed on his forward view of the outside world. HUDs therefore eliminate the dead time that would otherwise be taken for the pilot to change his gaze from the outside world to an instrument panel and back again to the outside world.

Simple HUDs comprise a display tube (usually a CRT) which generates the information to be presented to the pilot, a collimating optic which delivers the information to a partially reflecting combiner which is located in the pilots line of vision. However, these devices are of limited application because the pilots instantaneous field of view is limited according to the size of the collimating optic and the pilots position relative to that optic. That is, the pilot has the impression of looking through a distant porthole and head movement is required to see the edge of the field through the porthole.

Pupil-relay HUDs have been introduced to alleviate the "porthole" problem and these have the effect of locating the porthole in the plane of the pilots eyes and thereby provide for much larger instantaneous fields of view. Pupil-relay HUDs comprise a display tube followed by a relay optic which forms an intermediate image of the display in advance of the combiner which is powered so as to collimate the intermediate image for delivery to the pilot and to re-image the aperture stop formed by the relay lens as an exit pupil at the pilots eye position.

The design of the relay optic of a pupil-relay HUD is difficult if high-quality imagery is to be achieved over a reasonable field of view. For example because it requires to be relatively powerful it is difficult to prevent it introducing chromatic linespread of the display CRT. This can be corrected by increasing the complexity of the relay optic. Further, the complete system of relay optic and powered combiner optic must have an intrinsically low Petzval sum to be capable of providing a flat collimated image from a flat CRT and this complicates the relay optic since the combiner optic has to remain relatively simple to perform its dual purpose task. All of these factors lead to a comparatively large relay optic which in the environment of an aircraft cockpit, whether military or civil, produces packing problems in trying to fit the HUD into the existing aircraft roof-line. Prismatic wedges could be used in association with the relay optic to deviate its optical axis to conform to the aircraft roof-line but this proposal itself extends the axial length of the BUD and adversely affects chromatic linespread.

It is an object of the present invention to provide a new and improved form of head-up display which is comparatively compact and yet provides a comparatively wide instantaneous field of view to the operator.

SUMMARY OF THE INVENTION

According to the present invention there is provided a head-up display comprising a display device for generating information to be presented to an operator in superimposition with his forward view of the outside world, an off-axis reflectively-powered combiner optic for effecting said superimposition and a relay optic between the display device and the combiner optic, said relay optic being arranged to form an intermediate image of the displayed information in advance of the combiner optic and the combiner optic being arranged to collimate the intermediate image for delivery to the operator and to re-image the aperture stop formed by the relay optic as an exit pupil at the operator's eye position, wherein the relay optic comprises a relay lens and an axis deviation arrangement, said arrangement comprising a pair of surfaces which are mutually inclined at an acute angle each surface being both transmissive and reflective according to the angle of incidence of light thereon.

The reflective/transmissive surfaces are preferably in the form of holograms but alternatively they could be provided by mixed dielectrics or rugate (continuously variable refractive index) coatings. They may be located before or after the relay lens and they may be planar or curved. Holograms are preferred because they are diffractively powered, i.e. power is provided by an effect similar to that of a diffraction grating with variable structure, which is a depth effect in the holograms. Such holograms are referred to as 'volume phase' holograms.

One or both of the reflective/transmissive surfaces may have optical power that can be used to correct residual aberrations in the HUD. The diffractive power of the surfaces can correct for chromatic aberrations (e.g. chromatic linespread)). The surfaces may be spaced in air or may be on or at the bounding faces of a glass prism whose function is to reduce the acute angle between the surfaces to achieve the required design value of axis deviation due to the refractive index effect of the prism.

The axis deviation arrangement is preferably located between the relay lens and the combiner optic and may include a prismatic wedge proximal to the combiner optic to reduce the height of the reflective/transmissive surfaces due to the refractive index effect of the prism and/or a further prismatic wedge proximal to the relay lens. The inside face of each prismatic wedge is preferably in optical contact with the pertaining adjacent reflective/transmissive surface although manufacturing considerations may overrule this. Additionally a positively powered lens may be provided to increase light-convergence prior to the intermediate image.

The axis deviation arrangement most preferably is in the form of an optically contiguous unit comprising a central prism defining the acute angle, holograms of which one is curved so as to provide optical power at the surfaces of the central prism, a prismatic wedge at each hologram with each wedge forming an acute angle and oppositely orientated to the acute angle of the central prism, and a positively powered lens at the free surface of the prismatic wedge which is proximal to the curved hologram. Conveniently the holograms are initially formed on different prisms/wedges in the interests of manufacturing simplicty.

The relay optic may take any convenient form, for example it may comprise a plurality of lens elements and an aberration-correcting prism or wedge. When the reflective/transmissive surface proximal the combiner optic is powered this has the effect of making the design of the relay lens simpler because some aberrations in the HUD may be corrected by the powered surface and in addition to the need for less optical power in the relay lens, means that the relay lens can have fewer component lenses and be axially short. This results in the relay lens at a given dimension producing a wider field of view than would otherwise be possible. When the reflective/transmissive surfaces are separated by glass this reduces the size of the axis-deviation arrangement due to the refractive index effect of the glass. When a positively powered lens is used as part of the axis-deviation arrangement and proximal to the combiner optic this produces a reduction of the physical size of the reflective/ transmissive surfaces for a given size of exit pupil.

The combiner optic which is reflectively powered may take any form such as spectrally reflective by means of coating or holographic finishes and does not require to provide collimation.

When the axis-deviation unit is an optically contiguous unit as described it is located proximal to the aperture stop of the HUD and correction of chromatic dispersion for the complete HUD is provided by the diffractive power of the unit. Additionally, the concave reflective component of the unit tends to correct to a certain extent the off-axis aberrations introduced by the combiner optic.

BRIEF DESCRIPTION OF THE DRAWINGS

An embodiment of the present invention will now be described by way of example with reference to the accompanying drawing, in which:

FIG. 1 is a schematic view of a HUD in accordance with the present invention; and FIG. 2 shows a detail of FIG. 1 to a larger scale.

DETAILED DESCRIPTION OF THE PREFERRED EMBODIMENT

The drawing illustrates a Head-up Display 10 of the pupil relay type and comprises a display device 11 in the form of a CRT, a relay lens 12 which forms an intermediate image 13 of the information provided by the CRT 11 in advance of an off-axis reflectively-powered combiner 14. Combiner 14 in its reflective mode collimates the image 13 for delivery to the operator at station 15 where the operator's eyes are intended to be located and re-images the aperture stop formed by the relay lens 12 as an exit pupil at station 15. The arrangement of the combiner 14 is such that from station 15 the operator is presented with visual information generated by the CRT 11 in superimposition with his forward view of the outside world 16.

In accordance with the present invention an axis deviation arrangement 18 is provided in association with the relay lens 12 in order to provide that the optical axes at the entry and exit faces of the arrangement 18 are non colinear. A preferred form of arrangement 18 is shown in the drawing the primary components of which are two mutually inclined holograms A,B set at an acute angle of about 20°±10°. These holograms A, B are reflective and/or transmissive depending upon the angle of light incident thereon. In particular they are able to reflect selectively only a precisely defined spectral or angular bandwidth, light outside of that bandwidth being transmitted. Essentially the holograms act as angular edge filters that have a very fast transition between reflection and transmission, reflection occurring at lower angles of incidence and transmission at higher angles. Thus the two holograms A,B together function to produce an angular bend in the optical axis without significant light loss by selectively transmitting light at angles of incidence outside those required for reflection.

Holograms A,B are individually formed on glass slips C,D respectively for ease of manufacture and are held at their design angle by an interposed central prism E. Prismatic wedges F and G abut slips C and D respectively to increase the axis deviation as required. Typically wedges F and G would have apex angles in the range 0° to 60°. Finally, a positively powered lens H is provided in abutment with prism G to increase light convergence prior to the image 13 which results in a reduction in the height and width of the arrangement 18, the latter being out of the plane of the drawing. The various abutting surfaces of arrangement 18 are desirably cemented in good optical contact to minimise light loss.

Hologram B is preferably a non-conformal hologram on a curved slip B (to provide for correction of chromatic aberration within the HUD 20) whereas hologram A is preferably a conformal hologram on a planar slip C. The slip B is concave towards incident light from the CRT 11 which provides various advantages. Firstly, the Petzval (image) curvature sign is in the opposite sense to that of the relay lens 12 so that in conjunction with the combiner 14 which itself is concave reduces the requirement that the relay lens 12 should have a flat field. Secondly, the sign of the rotation or tilt of the curved hologram relative to the optical axis is opposite to that of the combiner 14 which thereby provides some compensation for the asymmetric aberrations introduced by the tilted combiner. Thirdly, in conjunction with the lens H the curved hologram B substantially reduces the optical power required of the relay lens 12 which has an advantageous effect on the length of the relay optic formed by the combination of items 12 and 18.

In order to make the hologram A,B function efficiently central prism E requires to be at a tilt angle which results in the length of the holograms A,B in the plane of the drawing being comparatively great. This length is reduced by the provision of prismatic wedge G to render arrangement 18 more compact. Prismatic wedge F enables a reduction in the axis deviation achieved by only the other components of the arrangement 18 and can allow for optimal position and angle of the CRT.

A major advantage in employing holograms A,B as the reflective/transmissive surfaces is that any chromatic linespread resulting for example from the relay lens 12 at the prismatic wedges F,G is easily reduced or eliminated by the non-conformal hologram B. This means that no chromatic aberration correction is required in the relay lens 12 and as a result excellent performance is available over a much greater field of view than hitherto, for example ±20° in azimuth (i.e. left to right) and ±13° in elevation (up or down).

In view of the foregoing the relay lens 12 may take any comparatively simple design for example as illustrated it may be formed of individual lens elements J,K,L,M,N,P arranged in two spaced groups to accommodate a monochromatic aberration correcting wedge Q. These six lens elements take up less space and provide a wider field of view than with known forms of relay lenses which have as many as eight lens elements. A narrow pass band filter R is located between lens elements L and M to remove unwanted transmission of sideband radiation from the CRT output. Thus filter R would typically only transmit green wavelengths.

The combiner 14 can be holographic so as to be spectrally reflecting at the wavelength appropriate to the output of the CRT 11 (usually green) or it can simply be rendered spectrally reflective by a coating. The combiner 14 may include a make-up lens bonded to the hologram to minimise outside world distortion and is retractable, i.e. adapted to be foldedaway.

It will now be appreciated that the HUD which has been described is both compact and of large instantaneous field of view with visibility over a reasonable range of operator eye position at station 15 and the combiner 14 can be folded away because of its simple and non-critical design. Accordingly the HUD is particularly adapted for use in civil aircraft or other civil vehicles. It will of course be understood that components 11, 12 and 18 may be mounted either on a fixed structure of the vehicle or on a helmet worn by the operator at station 15.

FIG. 2 itemises the various surfaces 24–35 of the arrangement 18 successively from the station 15 through the combiner 14 towards the CRT 11 and numeric data for these various surfaces for a specific design is provided in the following table:

NUMERIC DATA FOR SURFACES 20 to 36 SHOWN IN FIGS. 1 AND 2

| Surf No. | Radius mm | Sepn. mm | Material Nd | Vd | Tilt (deg) | Dec mm |
|---|---|---|---|---|---|---|
| 20 | Eye Posn | 276.2 | Air | | | |
| 21[4] | 1127.6 c | 8.0 | 1.517 | 64.2 | 18.52 | −13.95 |
| 22H | 520.1 c | −8.0 | 1.517 | 64.2 | | |
| 23[2] | 1127.6 c | −399.0 | Air | | 18.52 | 13.95 |
| 24[1] | 289.4 v | −16.4 | 1.651 | 55.9 | | −48.26 |
| 25[2] | Plano | −1.0 | Air | | | 20.03 |
| 26[5] | Plano | −32.51 | 1.517 | 64.2 | 13.21 | −33.42 |
| 27H | 842.7 c/v | −8.0 | 1.517 | 64.2 | | |
| 28 | Plano | −22.35 | 1.517 | 64.2 | | |
| 29H[1] | Plano | 22.35 | 1.517 | 64.2 | 20.0 | |
| 30[2] | Plano | 8.0 | 1.517 | 64.2 | −20.0 | |
| 31H | 842.7 v/c | −8.0 | 1.517 | 64.2 | | |
| 32 | Plano | −22.35 | 1.517 | 64.2 | | |
| 33H[1] | Plano | −4.0 | 1.517 | 64.2 | 20.0 | |
| 34 | Plano | −22.0 | 1.517 | 64.2 | | |
| 35[1] | Plano | −8.0 | Air | | | −21.0 |
| 36 | and on form a relay lens of focal length 129 mm. | | | | | |

The curved substrate for hologram B has a radius in the range Plano +3 F. The effective focal length of lens H is from Infinity to +1.5 F. F is the focal length of the overall system.

Key to Surface Data

Surface type [1] means decentre, then tilt before refraction

Surface type [2] means decentre, then tilt after refraction

Surface type [4] means tilt, then decentre before refraction

Surface type [5] means tilt, then decentre after refraction

Surface type 'H' means a holographic surface.

'c' means a surface that is concave to the incident light

'v' means a surface that is convex to the incident light

Separation distances are measured successively from the operator's eye position 20 at station 15 in FIG. 1 and any physical surface which provides more than one optical function is given a different surface number for each function.

Surface 22 is a conformal hologram having no diffractive power that acts as a 'notch' filter in that it reflects efficiently the spectral bandwidth of the display means while giving minimum attenuation of the outside world by transmission.

Surfaces 27 and 31 are transmission and reflection respectively at a non-conformal hologram that has both diffractive power and prism effect: this can be formed, for example, by the use of a point source and a concave mirror having a curvature different from that of the holographic substrate, the mirror being tilted and inclose proximity to the substrate on the side opposite to that of the source.

Surfaces 29 and 33 are reflection and transmission respectively at a conformal hologram, that is a hologram that has no diffractive power and which therefore acts only as a spectrally and angularly selective filter.

I claim:

1. A head-up display (10) comprising a display device (11) for generating information to be presented to an operator (15) in superimposition with his forward view of the outside world (16), a retractable off-axis reflectively-powered combiner optic (14) for effecting said superimposition and a relay optic (12,18) between the display device (11) and the combiner optic (14), said relay optic (12,18) forming an aperture stop and being arranged to form an intermediate image (13) of the displayed information in advance of the combiner optic (14) and the combiner optic (14) being arranged to collimate the intermediate image for delivery to the operator (15) and to re-image the aperture stop formed by the relay optic (12,18) as an exit pupil at the operator's eye position (20), wherein the relay optic (12,18) comprises a relay lens (12) and an axis deviation arrangement (18) located adjacent to the relay lens (12), proximal to the aperture stop of the system, and remote from the combiner optic (14), said arrangement (18) comprising an optical device having first and second surfaces which are close together and mutually inclined at an acute angle, each of the first and second surfaces being treated so as to be both transmissive and reflective according to the angle of incidence of light thereon, and light from the display device (11) is successively transmitted through the first surface towards the second surface, reflected at the second surface towards the first surface, reflected at the first surface towards the second surface, and thereafter transmitted through the second surface towards the combiner optic (14).

2. A head-up display as claimed in claim 1, wherein the axis deviation arrangement (18) is located between the relay lens (12) and the combiner optic (14) and includes a prismatic wedge (G) proximal to the combiner optic (14) to reduce the height of the reflective/transmissive first and second surfaces due to the refractive index effect of the prism (G).

3. A head-up display as claimed in claim 1, where the axis deviation arrangement (18) includes a prismatic wedge proximal to the relay lens (12).

4. A head-up display as claimed in claim 1, wherein the treatment of the first and second reflective/transmissive surfaces is a coating of mixed dielectrics.

5. A head-up display as claimed in claim 1, wherein the axis deviation arrangement (18) is in the form of an optically contiguous unit comprising a central prism (E) defining the acute angle, the treated first and second reflective/transmissive surfaces are in the form of holograms of which one is curved so as to provide optical power at the surfaces of the central prism (E), a prismatic wedge (F,G) at each hologram with each wedge (F,G) forming an acute angle and oppositely orientated to the acute angle of the central prism (E), and a positively powered lens (H) at the prismatic wedge surface which is proximal to the intermediate image (13).

6. A head-up display as claimed in claim 5, wherein the contiguous unit (18) is located proximal to the aperture stop of the display (10) and correction of chromatic dispersion for the complete display (10) is provided by the diffractive power of the unit (18).

7. A head-up display as claimed in claim 5, wherein the relay optic (12) comprises a plurality of lens elements (J,K,L,N,P) and an aberration-correcting prism or wedge (Q).

8. A head-up display (10) comprising a display device (11) for generating information to be presented to an operator (15) in superimposition with his forward view of the outside world (16), an off-axis reflectively-powered combiner optic (14) for effecting said superimposition and a relay optic (12,18) between the display device (11) and the combiner optic (14), said relay optic (12,18) forming an aperture stop and being arranged to form an intermediate image (13) of the displayed information in advance of the combiner optic (14) and the combiner optic (14) being arranged to collimate the intermediate image for delivery to the operator (15) and to re-image the aperture stop formed by the relay optic (12,18) as an exit pupil at the operator's eye position (20), wherein the relay optic (12,18) comprises a relay lens (12) and an axis deviation arrangement (18), said arrangement (18) comprising an optical device having first and second surfaces which are mutually inclined at an acute angle, each of the first and second surfaces being treated so as to be both transmissive and reflective according to the angle of incidence of light thereon, and light from the display device (11) is successively transmitted through the first surface towards the second surface, reflected at the second surface towards the first surface, reflected at the first surface towards the second surface, and thereafter transmitted through the second surface towards the combiner optic (14), and wherein the treatment of the first and second reflective/transmissive surfaces is a coating of mixed dielectrics.

9. A head-up display (10) comprising a display device (11) for generating information to be presented to an operator (15) in superimposition with his forward view of the outside world (16), an off-axis reflectively-powered combiner optic (14) for effecting said superimposition and a relay optic (12,18) between the display device (11) and the combiner optic (14), said relay optic (12,18) forming an aperture stop and being arranged to form an intermediate image (13) of the displayed information in advance of the combiner optic (14) and the combiner optic (14) being arranged to collimate the intermediate image for delivery to the operator (15) and to re-image the aperture stop formed by the relay optic (12,18) as an exit pupil at the operator's eye position (20), wherein the relay optic (12,18) comprises a relay lens (12) and an axis deviation arrangement (18), said arrangement (18) comprising an optical device having first and second surfaces which are mutually inclined at an acute angle, each of the first and second surfaces being treated so as to be both transmissive and reflective according to the angle of incidence of light thereon, and light from the display device (11) is successively transmitted through the first surface towards the second surface, reflected at the second surface towards the first surface, reflected at the first surface towards the second surface, and thereafter transmitted through the second surface towards the combiner optic (14), and wherein the axis deviation arrangement (18) is in the form of an optically contiguous unit comprising a central prism (E) defining the acute angle, the treated first and second reflective/transmissive surfaces are in the form of holograms of which one is curved so to provide optical power at the surfaces of the central prism (E), a prismatic wedge (F,G) at each hologram with each wedge (F,G) forming an acute angle and oppositely orientated to the acute angle of the central prism (E), and a positively powered lens (H) at the prismatic wedge surface which is proximal to the intermediate image (13).

10. A head-up display as claimed in claim 9, wherein the contiguous unit (18) is located proximal to the aperture stop of the display (10) and correction of chromatic dispersion for the complete display (10) is provided by the diffractive power of the unit (18).

11. A head-up display as claimed in claim 9, wherein the relay optic (12) comprises a plurality of lens elements (J,K,L,N,P) and an aberration-correcting prism or wedge (Q).

* * * * *